(12) United States Patent
Berbuer (10) Patent No.: US 7,165,569 B2
(45) Date of Patent: Jan. 23, 2007

(54) SAFETY SHUT-OFF DEVICE

(75) Inventor: Juergen Berbuer, Aachen (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 279 days.

(21) Appl. No.: 10/911,852

(22) Filed: Aug. 5, 2004

(65) Prior Publication Data
US 2005/0076950 A1 Apr. 14, 2005

(30) Foreign Application Priority Data
Aug. 7, 2003 (DE) ................................ 103 37 370

(51) Int. Cl.
*F16K 17/00* (2006.01)
(52) U.S. Cl. .................... 137/87.01; 137/106; 137/595
(58) Field of Classification Search ............ 137/87.01, 137/106, 595; 91/420
See application file for complete search history.

(56) References Cited

U.S. PATENT DOCUMENTS

| 3,576,192 | A | * | 4/1971 | Wood et al. ................. 137/102 |
| 4,448,211 | A | * | 5/1984 | Yoshida ....................... 137/112 |
| 5,349,818 | A | * | 9/1994 | McFadyen et al. ......... 137/106 |
| 5,375,418 | A | * | 12/1994 | Shelhart et al. ............... 91/420 |
| 5,564,280 | A |   | 10/1996 | Schilling et al. |
| 5,660,051 | A |   | 8/1997 | Sakakibara et al. |
| 5,918,475 | A |   | 7/1999 | Sakakibara et al. |
| 5,983,657 | A |   | 11/1999 | Murata et al. |
| 6,370,898 | B1 |  | 4/2002 | Yamaguchi et al. |

* cited by examiner

*Primary Examiner*—Stephen M. Hepperle
(74) *Attorney, Agent, or Firm*—Brinks Hofer Gilson & Lione (57) ABSTRACT

The invention relates to a safety shut-off device for sections of fluid circuits, which in case of damage or the like, have to shut off from each other on safety considerations. The safety shut-off device includes two chambers with connections for the sections to be shut off from each other. The chambers are separated from each other by a piston and have two connections each, of which one is closed by closing elements with sealing force elements, when both chambers have the same pressure. Further, two actuating devices are provided which are functionally connected to the closing elements and the piston. When the piston is moved due to a pressure difference between the connections, the closing element in the chamber with the higher pressure opens the associated connection so that fluid can flow from a section with higher pressure into the other section with lower pressure. The accompanying pressure increase in the section with the lower pressure ensures that the corresponding closing element of the chamber with the lower pressure is overcome by the fluid against the pressure of the sealing force element so that the fluid is capable to circulate in both sections.

5 Claims, 7 Drawing Sheets

SAFETY SHUT-OFF DEVICE

BACKGROUND OF THE INVENTION

1. Field of Invention

The invention relates to a safety shut-off device for sections of fluid circuits that, in case of damage or the like, have to be shut off from each other on safety considerations.

2. Related Technology

Such safety shut-off devices are provided in order to shut off single sections of, for example, refrigerant or hydraulic circuits in case of damage and to prevent the fluid contained in the circuits from completely flowing out. This ensures that the outflow of fluids (which are relevant considering safety, cost-intensive and hazardous for the environment or health) from a damaged circuit is limited.

It is known in the state-of-the-art to be anxious to shut off various circuit sections, for example refrigerant circuits. The peculiar problem is the fact that the refrigerants are substances that are hazardous for the environment or, due to enrichment of refrigerants in the areas being air-conditioned, are hazardous to the persons in these areas. This is particularly relevant for refrigerant plants in motor vehicles where, in case of damage, the passengers could be confronted with the refrigerant in a very small space.

U.S. Pat. No. 5,918,475 proposes, in case of damage of vehicle air conditioning units, to dose, for example, the air exit of the air conditioning unit into the passenger compartment in order to prevent or reduce the entry of refrigerant into the passenger compartment. Following this strategy, however, does not avoid the loss of refrigerant from the system; only the entry of refrigerant into the passenger compartment will be reduced.

A particular disadvantage is that, in the case of damage, it cannot be ensured that no other leaks or connections to the passenger compartment developed, which would allow the refrigerant to flow into the passenger cell.

The solution, in the case of damage to only single parts or sections of the refrigerant plant that has been know for long and is described in the state-of-the-art. One possibility is that an externally controlled valve is closed in a de-energized condition and therefore shuts off the evaporator exit. Another possibility is to provide non-return valves in order to prevent any unintentional exit of the refrigerant due to back flowing of the refrigerant into sections affected by the damage.

According to the teachings of U.S. Pat. No. 5,983,657 it is proposed (for a vehicle air conditioning unit) to use a combination of an electromagnetic valve and anon-return valve to prevent the refrigerant from flowing out of the evaporator when the compressor is not operating. The decompression valve is used as the electromagnetic valve.

A disadvantage of the described state-of-the-art, particularly if the decompression valve is used as a shut-off valve, is that the decompression valve is limited in its true function due to the added sealing function. Further, a decompression device extended by such an additional function is more cost-intensive because of the higher complexity of the structure.

This invention is therefore aimed at the establishment of a safety shut-off device that undertakes the shut-off of sections or line loops of a fluid circuit without an expensive control.

SUMMARY OF THE INVENTION

The problem mentioned above is solved by a safety shut-off device that, in one embodiment, includes two chambers with connections for the sections that are to be shut off from each other. The chambers have two connections each and are separated from each other by a piston. One of the connections for each chamber is closed by a closing element with a sealing force element, this occurring when both chambers have the same pressure. Further, two actuating devices are provided so as to be functionally connection to the closing elements and the piston. When the piston is moved due to a pressure difference between the connections, the closing element in the chamber with the higher pressure therefore opens the associated connection so that fluid can flow from a section with higher pressure into the other section with lower pressure. The accompanying pressure increase in the section with the previously lower pressure ensures that the corresponding closing element of the chamber with the lower pressure is overcome by the fluid against the pressure of the sealing force element so that the fluid is capable to circulate in both sections.

Alternatively, the problem of the invention is solved by a safety shut-off device that has at least two segmenting valves which are connected to a control chamber at low pressure. The segmenting valve have stepped pistons that, held by a sealing force element, close a sealing taper connection. Further, an annular chamber connection is provided in the body of the segmenting valve and through which the fluid (after having overcome the sealing force element) flows from a first segmenting valve from a section to be shut off of the fluid circuit into another section to be shut off and eventually into the second segmenting valve. Through the sealing taper connection for the second segmenting valve, the fluid flows to the annular chamber connection back into the adjacent section to be shut off of the fluid circuit. According to the invention, the control chamber has the lowest system pressure, whereby fluid can only flow in the segmenting valve if there is a pressure difference between the pressure at the annular chamber connection or the sealing taper connection, and the pressure in the control chamber. In addition, a non-return valve is provided that enables pressure balancing between the control chamber and the annular chamber connection when the pressure in the control chamber is too high.

According to a preferred embodiment of the invention the stepped piston has an elastomer coating with a sealing lip, with the sealing lip functioning as non-return valve. When the stepped piston is dosed the fluid, after having overcome the sealing lip, flows from the control chamber to the annular chamber connection. In this embodiment the stepped piston is provided in the body so as to create an annular gap to pas the fluid from the section of the control chamber over the sealing lip to the sealing taper connection. The sealing lip thus functions as a non-return valve.

Preferably a number N of segmenting valves are provided for a safety shut-off device, whereby N sections are capable of being shut off from each other.

According to the concept of the invention, the safety shut-off device is a passive one, which on pressure balance shuts off at least two sections from each other or separates, respectively, one section from the remainder of the fluid circuit. It is particularly advantageous that in case of damage, without any auxiliary energy added, further afterflow or outflow, respectively, of fluid into or out of, respectively, a section of the fluid circuit is prevented.

BRIEF DESCRIPTION OF THE DRAWINGS

Additional details, features and advantages of the invention will become apparent from the subsequent description of exemplary embodiments taken in conjunction with the accompanying drawings of which shows.

DETAILED DESCRIPTION OF THE INVENTION

Figure 1:
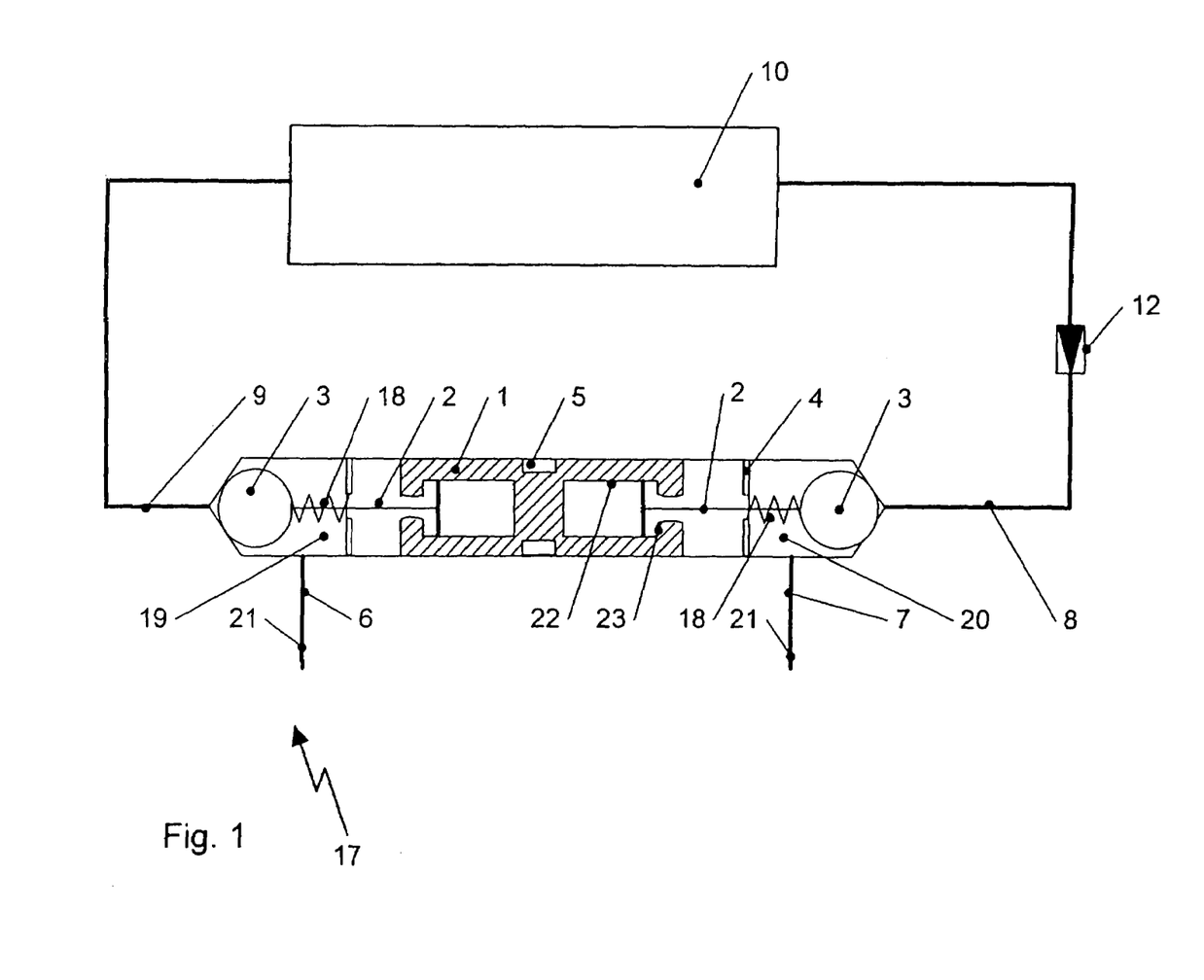
FIG. 1 safety shut-off device, schematic sectional view.

FIG. 1 shows a safety shut-off device 17 with two chambers 19, 20. Connections 8, 9 and 6, 7 for the sections to be shut off from each other 10, 21 are arranged at the chambers. The chambers 19, 20 are separated from each other by a piston 1. One connection 8, 9 in each case in the chambers 20, 19 is dosed by closing elements 3 with sealing force elements 18. If the chamber 19, 20 have the same pressure, the closing elements 3 tightly close the connections 8, 9 by means of the sealing force elements 18. In this position no fluid can circulate between the section 10 and the section 21.

In case of damage in section 10, only the fluid contained there can exit; the fluid contained in section 21 cannot pass to the outside over the section 10, because it is prevented from entering into the section 10 by the closing elements 3.

The closing elements are provided with two actuating devices 2 that are functionally connected to the closing elements 3 and the piston 1 so that when the piston 1 is moved due to a pressure difference in the chambers 19, 20 or at the connections 6, 7, the closing element 3 in the chamber with the higher pressure opens the associated connection so that the fluid can flow from the section 21 into the section 10. The pressure increase accompanying the flowing in of the fluid results in that the corresponding closing element 3 is overcome by the fluid against the sealing force element 18 so that the fluid can flow into the section 21. According to the preferred embodiment of the invention the sealing force elements 18 are designed as springs.

According to another advantageous embodiment of the safety shut-off device 17 of the invention, the movement of the piston 1 is limited by limiting elements 4. In this case the actuating devices 2 are guided in the interior of the piston 1 by a guide 22 with a stop 23. When the piston 1 is displaced, the actuating devices 2 are taken along by the stop 23 in direction of pressure propagation so that the closing element 3 opens the respective connection 8 or 9 for the fluid.

Preferably the safety shut-off device 17 is designed symmetric, whereby on pressure balance in the chambers 19 and 20, the piston 1 is in a central position.

Figure 2:
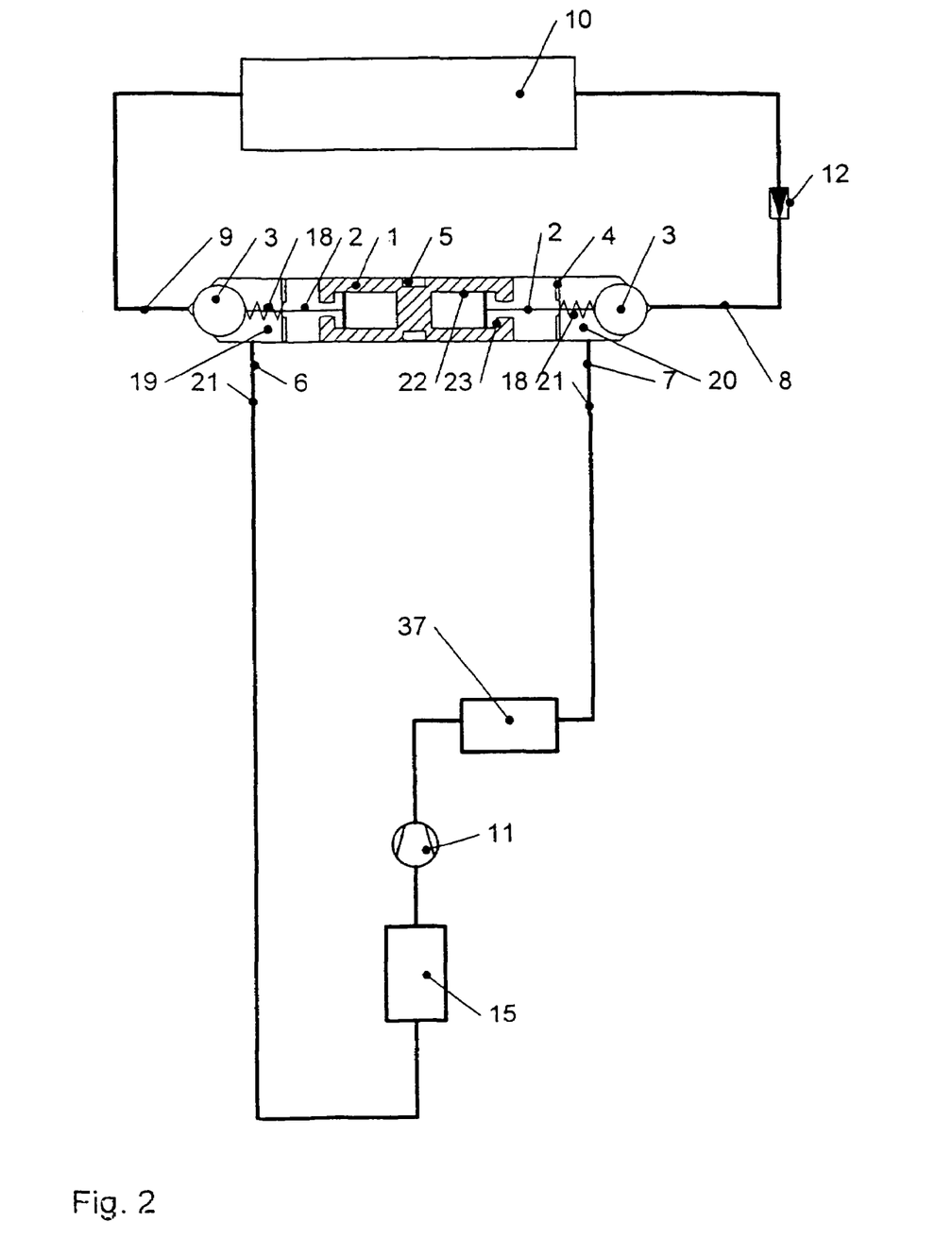
FIG. 2 refrigeration plant with safety shut-off device, principal circuit diagram.

In FIG. 2, a refrigerant circuit according to the invention is schematically shown, in which a safety shut-off device 17 is provided. Here the section to be shut off 10 is the inner heat exchanger of an air conditioning unit, or the evaporator, respectively.

The operations of the refrigerant circuit is as follows: A compressor 11 compresses refrigerant vapor, which is cooled, or liquefied, respectively, in the gas cooler/condenser 37 at high pressure. The refrigerant passes at high pressure through the connection socket 7 into the chamber 20 of the safety shut-off device 17. Because of the high pressure, the piston 1 is moved to the left and the actuating device 2 is taken along by the stop 23. The closing element 3 opens the connection socket 8, the refrigerant can flow to the decompression element 12 and then to the evaporator 10. Thus, the refrigerant is at the connection socket 9 of the safety shut-off device 17 at low pressure. Through a pressure build-up by the applied refrigerant the closing element 3 is displaced against the force of the sealing force element 18 so that the refrigerant flows into the chamber 19 and to the connection socket 6 and then to the refrigerant collector 15 and finally to the compressor 11.

Figure 3:
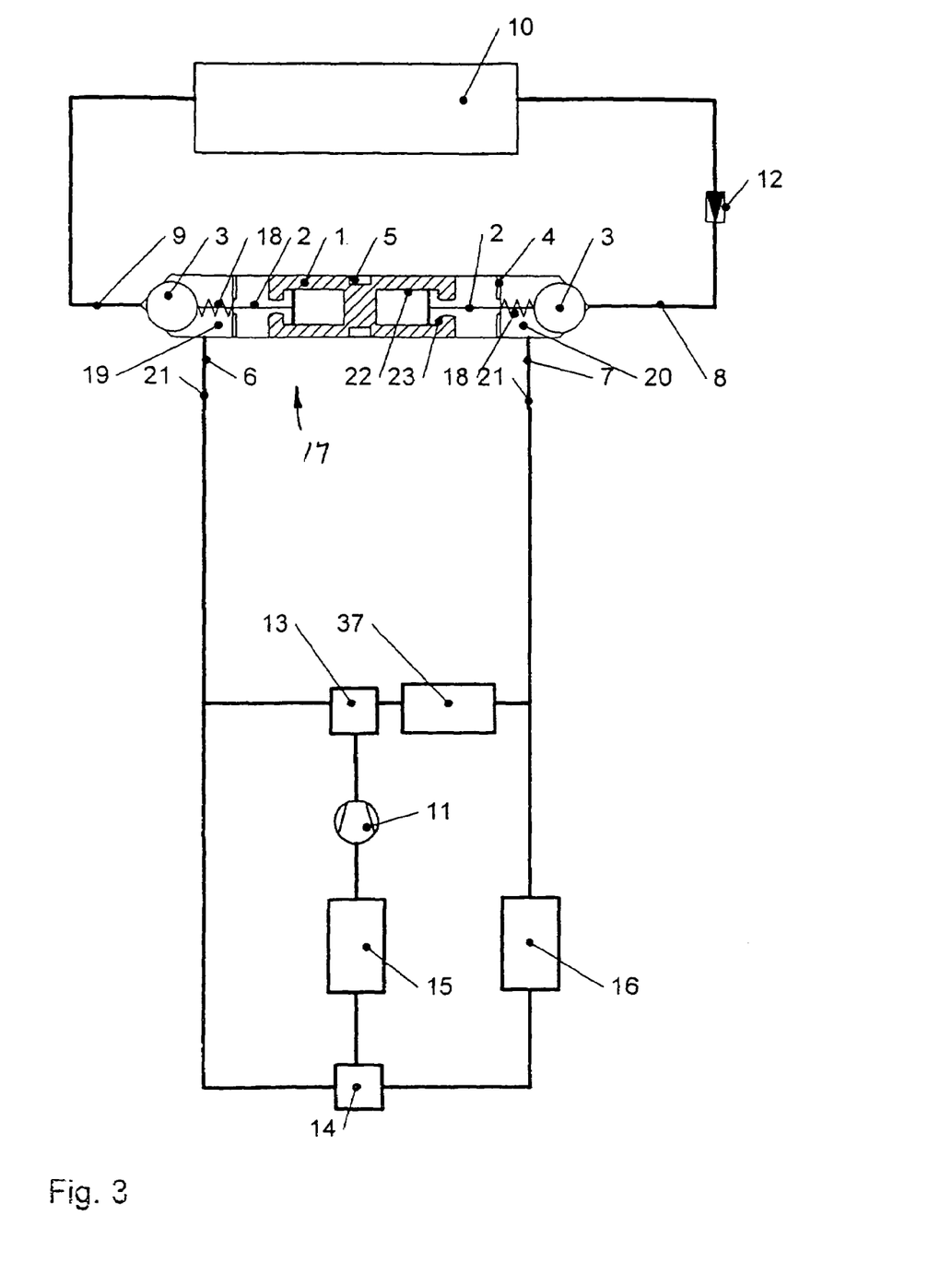
FIG. 3 combined heat pump/air conditioning unit with safety shut-off device.

A particular advantage of the use of the safety shut-off device 17 according to the invention is that, based on its symmetric design, the safety shut-off device 17 is not only suitable for the air conditioning design of a refrigerant circuit, but also for the combined air conditioning unit-heat pump operation as shown in FIG. 3. In such a construction, it is particularly advantageous that the piston 1 is positioned depending on the pressure application of the chambers 19, 20 by the fluid at the connections 6 and 7, whereby the plant automatically and passively adapts itself to the operational mode by a change of the operational mode without any specific control being needed at the safety shut-off device 17.

In FIG. 3 a combined air conditioning unit/heat pump is shown in a principal circuit diagram. It should be noted that because of the symmetry, the safety shut-off device 17 can be used for sections, or line loops, respectively, with changing direction in the flow of the fluid. In heat pump mode, the multi-way valve 13 is oriented so that the refrigerant flows in contrast to the function described according to FIG. 2, from the compressor to the connection socket 6 and through the chamber 19 to the connection socket 9 and, thus in opposite direction of flow through the heat exchanger 10 now operating as condenser/gas cooler to the decompression element 12. Over a refrigerant/coolant heat exchanger 16, operating as evaporator, the refrigerant is then passed via the multi-way valve 14 to the refrigerant collector 15 and compressor 11. In the air conditioning mode, multi-way valve 13 passes the refrigerant from the compressor 11 to the gas/cooler condenser 37 and multi-way valve 14 passes the refrigerant from chamber 19 to the refrigerant collector 15.

Figure 4:
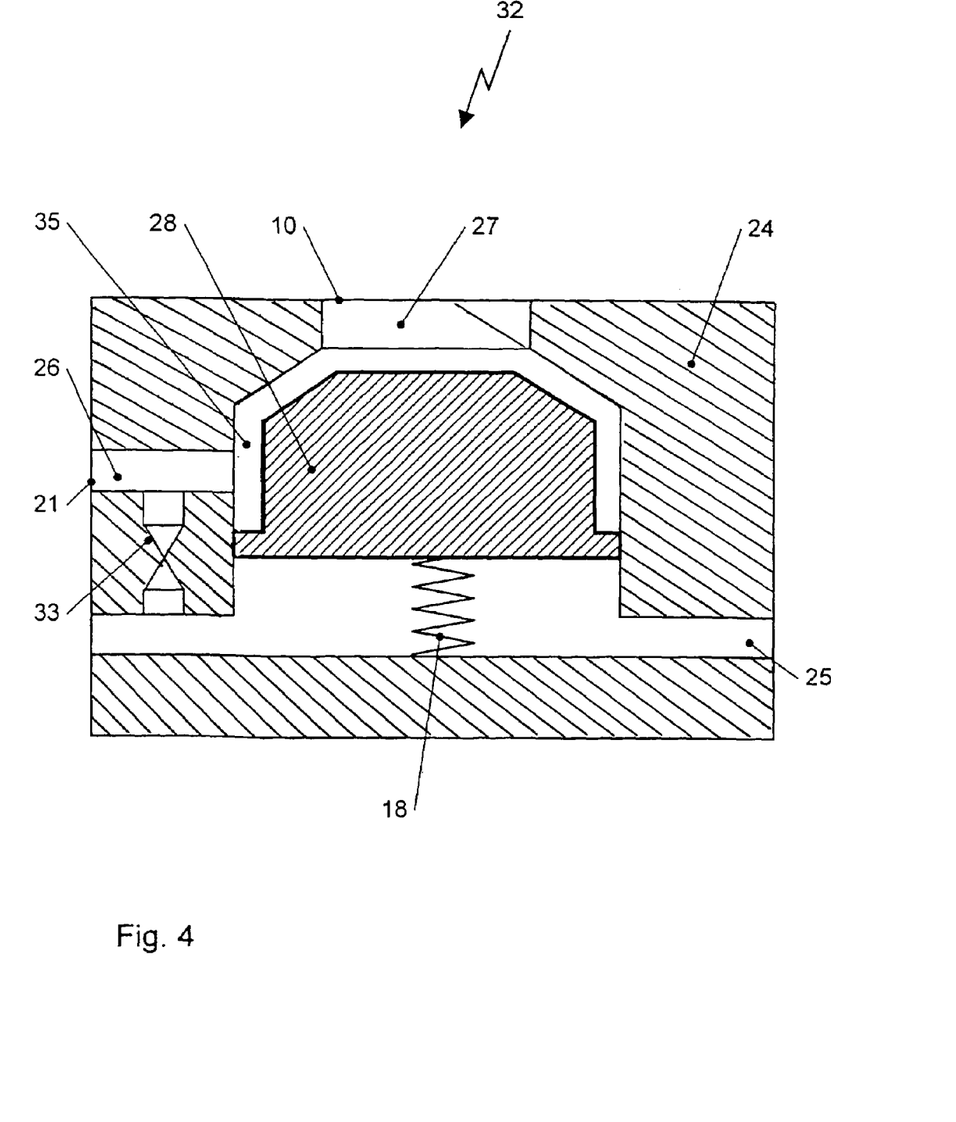
FIG. 4 segmenting valve with integral non-return valve.

FIG. 4 shows a segmenting valve 32, for use as an alternate embodiment of the invention, with an integrated non-return valve 33. A control chamber 25, an annular chamber connection 26 and a sealing taper connection 27 are made in the body 24. The fluid can enter through the annular chamber connection 26 or the sealing taper connection 27. A stepped piston 28 is held by a sealing force element 18 in such a way that the stepped piston 28 doses the sealing taper connection 27. In this dosed position of the stepped piston 28, all three connections 26, 27 and 25 are shut off from each other. When in a section 21 to be shut off of a fluid circuit, for example, at the annular chamber connection 26 or the sealing taper connection 27, a fluid is at high pressure, the stepped piston 28 is displaced against the force of the sealing element 18 and fluid flows over the cylinder ring in the body 24, with the ring designed to be an annular channel 35 in the lower portion, from one to the other connection 26, 27, respectively.

If a fluid of the section 10 of a fluid circuit is at high pressure at the annular chamber connection 26, the fluid flows after opening of the flow path by the stepped piston 28, as described above, over the annular channel 35 to the sealing taper connection 27 and hence passes from the section 10 to the section 21 to be shut off. In the representation according to FIG. 4 a non-return valve 33 is arranged between the control chamber 25 and the annular chamber connection 26.

If there is a higher pressure in the control chamber 25 compared with the section 10 of the fluid circuit, this pressure is relieved over the non-return valve 33 to the annular chamber connection 26. The segmenting valve 32 with the mechanical non-return valve 33 permits fluid flow only when and is opened in this sense, if either a fluid flow at high pressure in contrast to the pressure in the control chamber 25 opens the stepped piston 28 against the force of the sealing force element 18, or if the pressure in the control chamber 25 there is a pressure that is significantly higher than the lowest system pressure and this higher fluid pressure relieves over the non-return valve 33 to the annular chamber connection 26.

Figure 5:
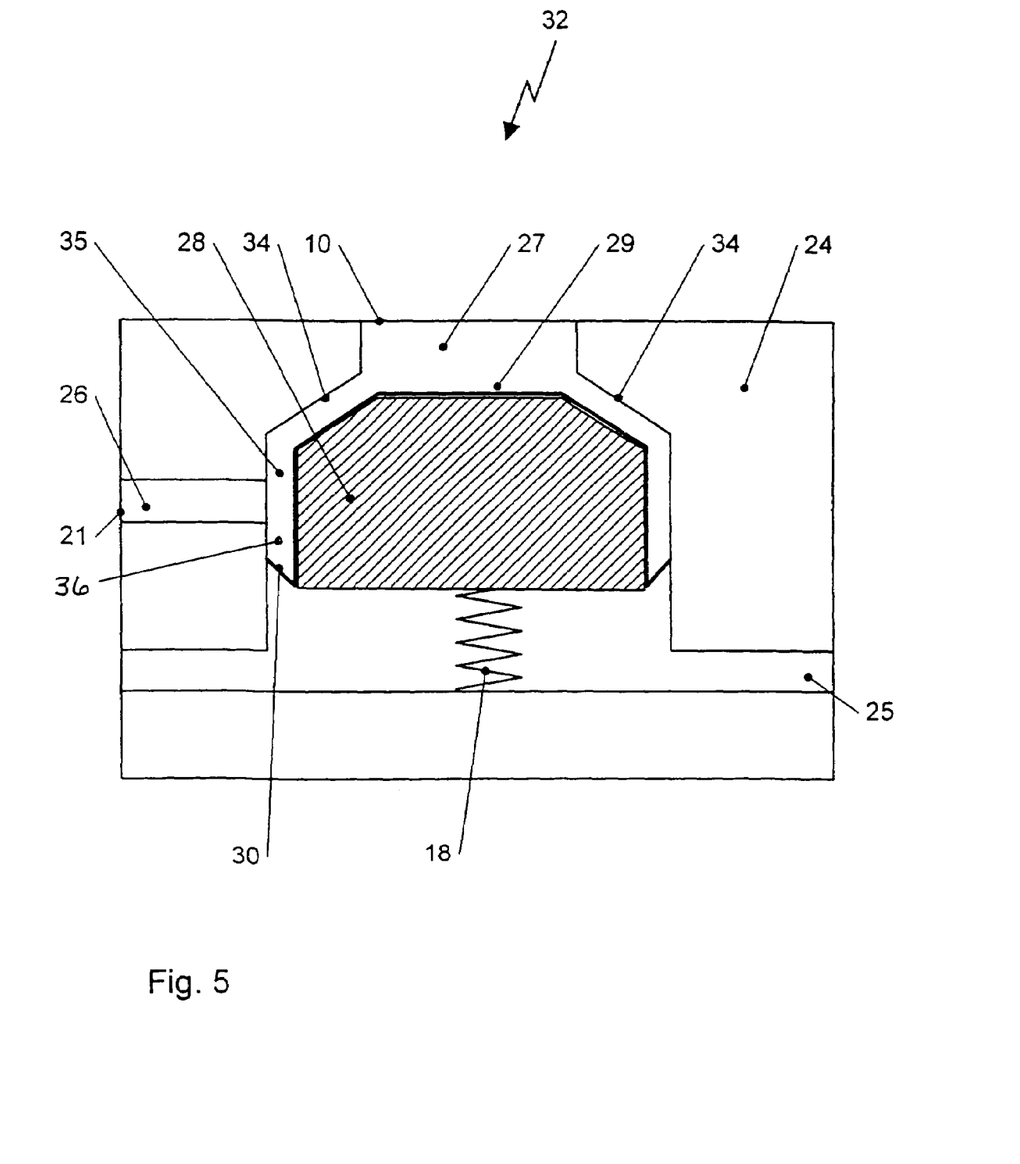
FIG. 5. segmenting valve with elastomeric sealing lip as non-return valve.

In FIG. 5 a segmenting valve with elastomer sealing lip 30 as non-return valve 33 is shown is a preferred embodiment of the invention. Analogous to the representation in FIG. 4, the control chamber 25, the annular chamber connection 26 and the sealing taper connection 27 are arranged in the body 24. According to the shown advantageous embodiment of the invention, the stepped piston 28 is provided with an elastomer coating 29. It is a particular advantage that the elastomer coating 29 at the sealing flanks 34 of the body, under the condition of small pressure differences, seals the section of the annular chamber connection 26 from the section of the sealing taper connection 27.

According to a particularly preferred embodiment of the invention the elastomer coating 29 at its ends is adopted to form a sealing lip 30. The sealing lip 30 with its limiting end bears against the body 24 such that, under high pressure application over the annular chamber connection 26 or the sealing taper connection 27, the sealing lip 30 is pressed against the body 24 and seals the annular channel 35 against the annular channel 36 and the control chamber 25, whereby the fluid at high pressure can pass from the annular chamber connection 26 to the sealing taper connection 27, after due to the pressure difference in the annular channel 35 relative to the pressure in the control chamber 25, the stepped piston 28 displaced in direction of the control chamber 25.

According to the invention the control chamber 25 is always connected with the lowest pressure predominant in the system. The sealing lip 30, according to this preferred embodiment, additionally functions as non-return valve to provide for a pressure balance in case of higher pressure in the control chamber 25 compared to the annular channel 35 so that afterwards, in the control chamber 25, therein also the lower pressure of the annular channel 35. Fluid flow from the annular channel 35 into the control chamber 25 is without appreciable mass flow only due to the pressure balancing within the fluid circuit over a deliberate and admitted leakage past the sealing lip 30 through the annular gap 36 into the control chamber 25.

The control chamber 25 of this preferred embodiment of the invention has only a minimum volume for the use in a refrigerant circuit and is designed as dead volume without mass flow function and does not contribute to the refrigerant transport. The control chamber 25 essentially serves as reference of the low pressure for the realization of the segmenting function of the segmenting valve 32 according to the invention.

A particular advantage of this embodiment is that by the provision of an elastomer coating 29 and a sealing lip 30, two functions can be production-economically implemented in a segmenting valve 32. First, the elastomer coating 29 on the stepped piston 28 seals the sections to be shut off from each other at the sealing flanks 34 without expensive machining of the inner surfaces of the body 24 and the outer surface of the stepped piston 28, respectively. Second, the elastomer coating 29 designed as sealing lip 30 at the ends performs the function of a non-return valve 33.

A spring functions as a sealing force element 18, whereby the control states and necessary pressure differences for the segmenting valve 32 can be controlled through the dimensioning of the spring.

According to this embodiment of the invention, the concept is realized to shut off in case of damage also several lines, or line loops, respectively. This is achieved by that three pressures are compared by the segmenting valve 32—the pressures at the annular chamber connection 26, sealing taper connection 27 and control chamber 25. The connection of a plurality of segmenting valves 32 to the safety shut-off device 31 over the control chamber 25 enables to establish a number N of section to be shut off from each other corresponding to the number N of segmenting valves 32.

As in the case of damage, the pressure difference in fluid systems level out very quickly, the sections to be shut off from each other are securely separated by the sealing force elements 18 and their action on the stepped piston 28, and the outflow of fluid from the sections of the fluid circuit not directly affected by the damage is effectively avoided.

Figure 6:
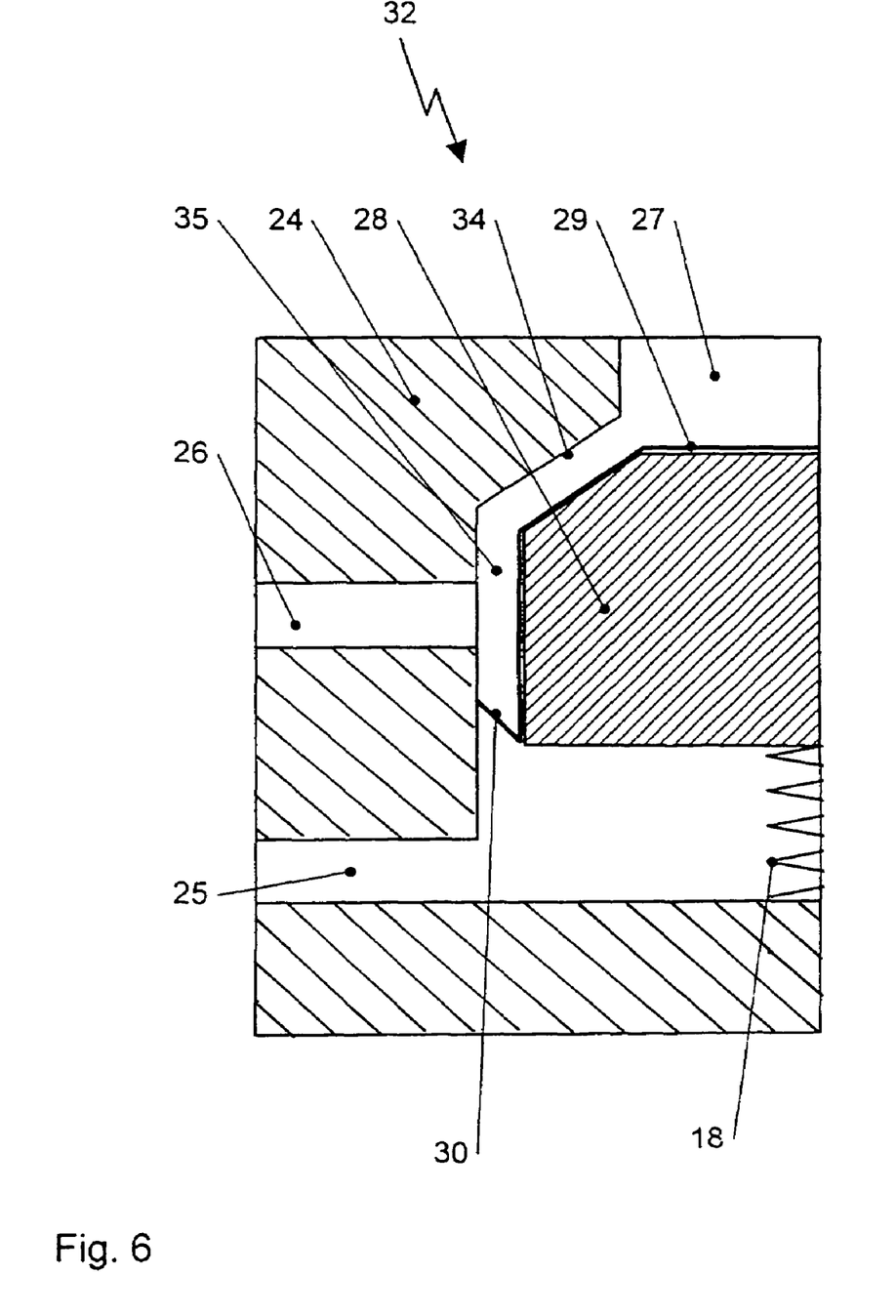
FIG. 6 partial view of a segmenting valve with sealing lip.

FIG. 6 is an enlarged representation of the preferred embodiment of the control piston with elastomer coating 29 and sealing lip 30. The stepped piston 28 is in its upper part surrounded by any elastomer coating 29, at the end of which a sealing lip 30 is made or formed, respectively. The sealing lip 30 closes the annular gap 36 such that a fluid under high pressure can flow into the annular channel 35 through the annular chamber connection 26 and flow off to the sealing taper connection 27. The sealing lip 30 prevents the fluid from flowing to the control chamber 25. It is particularly advantageous that this allows to achieve that the body 24 with the cylinder designed in it needs no manufacture- and cost-intensive treatment due to the sealing function of the elastomer.

Figure 7:
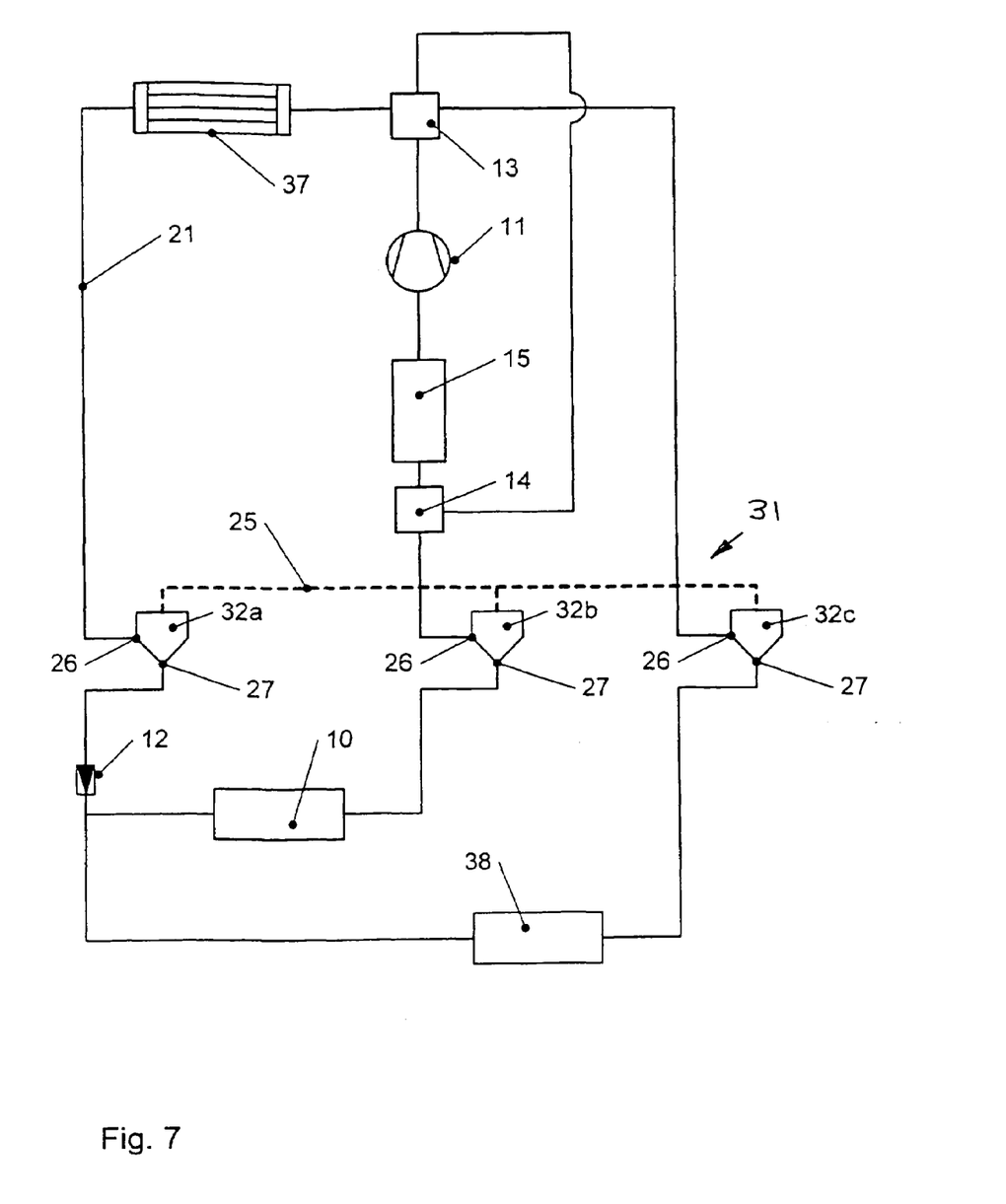
FIG. 7. segmenting valve block in an application with three sections to be shut off.

FIG. 7 presents an embodiment according to the invention of a safety shut-off device 31 consisting of three segmenting valves 32 as it is used, for example, in a refrigerant circuit of a combined air conditioning unit/heat pump of a motor vehicle, whereby in the case presented, an additional inner heat exchanger 38 is provided in addition to the evaporator 10. The control chamber 25 connects all three segmenting valves 32a, 32b and 32c to each other.

At the annular chamber connection 26 of the segmenting valve 32a, in heat pump mode, there is fluid at high pressure in the section 21, which flows over the sealing taper connection 27 into the section 10 with the evaporators to be shut off in case of damage. In air conditioning mode the refrigerant flows to the sealing taper connection 27 of the segmenting valve 32b and eventually to the compressor 11 over the refrigerant collector 15.

In heat pump mode the refrigerant passes through the annular chamber connection 26 of the segmenting valve 32c to the sealing taper connection 27 and through the decompression element 12 and the additional inner heat exchanger 38 to the sealing taper connection 27 of the segmenting valve 32*a*.

According to another embodiment of the invention the safety shut-off device can also be advantageously used for hydraulic systems.

The invention claimed is:

1. Safety shut-off device for sections of fluid circuits comprising the safety shut-off device has two chambers with connections and for sections to be shut-off from each other and the chambers are separated by a piston from each other, whereby the connections are closed by closing elements with sealing force elements at equal pressures in the chambers, and that two actuating devices are provided which are functionally connected to the closing elements and the piston such that for a displacement of the piston caused by a pressure difference between the connections the closing elements in the chamber at the higher pressure opens the accompanying connection and fluid can enter from the first section into the second section and that due to the accompanying increase of the pressure the fluid overcomes the corresponding closing element against the sealing force element and the fluid can flow into the second section after having passed the first section.

2. The safety shut-off device of claim 1 wherein the displacement of the piston is limited by limiting elements.

3. The safety shut-off device of claim 1 wherein a guide with a stop is provided for the actuating devices in the interior of the piston and that the actuating device is taken along by the stop when the piston is displaced, in direction of the pressure propagation, whereby the closing element releases the corresponding connection or for the fluid.

4. The safety shut-if device of claim 1 wherein the safety shut-off device is designed symmetric and the piston is located in a central position on pressure balance of the chambers.

5. The safety shut-off device of claim 1 wherein the sealing force elements are springs.

\* \* \* \* \*

UNITED STATES PATENT AND TRADEMARK OFFICE
CERTIFICATE OF CORRECTION

| | | |
|---|---|---|
| PATENT NO. | : 7,165,569 B2 | Page 1 of 1 |
| APPLICATION NO. | : 10/911852 | |
| DATED | : January 23, 2007 | |
| INVENTOR(S) | : Juergen Berbuer | |

It is certified that error appears in the above-identified patent and that said Letters Patent is hereby corrected as shown below:

Column 8, in claim 4, line 13, after "The safety" delete "shut-if" and substitute --shut-off-- in its place.

Signed and Sealed this

Twenty-fourth Day of April, 2007

JON W. DUDAS
*Director of the United States Patent and Trademark Office*